(12) United States Patent
Atmur

(10) Patent No.: US 6,777,658 B2
(45) Date of Patent: Aug. 17, 2004

(54) OPTICAL TRACKING SYSTEM, FEED-FORWARD AUGMENTATION ASSEMBLY AND METHOD FOR CONTROLLING AN OPTICAL IMAGING SYSTEM WITH REDUCED RESIDUAL JITTER

(75) Inventor: Robert J. Atmur, Whittier, CA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 10/230,599

(22) Filed: Aug. 29, 2002

(65) Prior Publication Data

US 2004/0041076 A1 Mar. 4, 2004

(51) Int. Cl.$^7$ .............................................. G01C 21/24
(52) U.S. Cl. ................................................... 250/206.1
(58) Field of Search ............................ 250/206, 206.1; 356/905; 359/399; 700/45

(56) References Cited

U.S. PATENT DOCUMENTS

| | | | |
|---|---|---|---|
| 5,359,520 A | * 10/1994 | Aubrun et al. | 700/44 |
| 5,869,945 A | * 2/1999 | Ha et al. | 318/600 |
| 6,369,942 B1 | 4/2002 | Hedrick et al. | |
| 6,396,638 B1 | 5/2002 | Yoo et al. | |

OTHER PUBLICATIONS

Shinhak Lee, James W. Alexander, Gerry G. Ortiz; *Deep Space Acquisition, Tracking, Pointing (ATP) Technologies for Optical Communication*; JPL; Sep. 22, 1999; 26 pages; Available at <http://descansymposium.jpl.nasa.gov/database/pdf/210_lees.pdf>.

\* cited by examiner

*Primary Examiner*—Nikita Wells
*Assistant Examiner*—Christopher M. Kalivoda

(57) ABSTRACT

A system is provided for controlling an optical imaging system, such as a telescope, capable of providing an image of a target. The system includes a closed-loop optical tracking system comprising a reflector, an imaging device and a tracker controller. The reflector is capable of reflecting the image provided by the optical imaging system. In turn, the imaging device can record the image reflected by the reflector. And the tracker controller can generate a reflector position drive signal from a position of the target determined based upon the image recorded by the imaging device. The system also includes feed-forward augmentation assembly capable of measuring a displacement of a position of the target and thereafter generating a feed-forward augmentation signal. The feed-forward augmentation assembly can then combine the feed-forward augmentation signal and the reflector position drive signal to thereby drive the reflector to a position.

18 Claims, 3 Drawing Sheets

OPTICAL TRACKING SYSTEM, FEED-FORWARD AUGMENTATION ASSEMBLY AND METHOD FOR CONTROLLING AN OPTICAL IMAGING SYSTEM WITH REDUCED RESIDUAL JITTER

FEDERALLY SPONSORED RESEARCH OR DEVELOPMENT

This invention was made with government support under Contract No. F29601-00-D-0204 awarded by the Department of the Air Force. The government may have certain rights in this invention.

FIELD OF THE INVENTION

The present invention relates to systems and methods for controlling tracking systems and, more particularly, relates to systems and methods for controlling tracking systems with reduced residual jitter in the tracking system.

BACKGROUND OF THE INVENTION

Telescopes used in many industries comprise large, sophisticated computer-controlled instruments with full digital outputs. And whereas telescopes have evolved over time, designers have paid particular attention to telescope parameters, including the light-collecting power of the telescope (as a function of the diameter of the telescope) and the angular resolution (as measured by image sharpness). For a perfect telescope operated in a vacuum, resolution is directly proportional to the inverse of the telescope diameter. In this regard, the perfect telescope generally converts a plane wavefront from distant star (effectively at infinity) into a perfectly spherical wavefront, thus forming the image with an angular resolution only limited by light diffraction.

In practice, however, errors such as atmospheric and telescope errors distort the spherical wavefront, creating phase errors in the image-forming ray paths. Generally, the cause of such atmospheric distortion is random spatial and temporal wavefront perturbations induced by turbulence in various layers of the atmosphere. Image quality can also be affected by permanent manufacturing errors and by long time scale-wavefront aberrations introduced by mechanical, thermal, and optical effects in the telescope, such as defocusing, decentering, or mirror deformations generated by their supporting devices.

In light of the errors introduced into such telescope systems, mechanical improvements have been made to minimize telescope errors. As a result of requirements for many large telescopes, typically those with primary mirrors above one meter, a technique known as active optics was developed for medium or large telescopes, with image quality optimized automatically by means of constant adjustments by in-built corrective optical elements. In this regard, telescope systems operating according to the adaptive optics technique generally include an adaptive optics assembly that comprises a deformable mirror that is optically coupled to the telescope behind the focus of the telescope at or near an image of the pupil. The deformable mirror, which includes a number of actuators for essentially changing the shape of the mirror, is controlled to apply wavefront correction to images received by the telescope.

In addition to the adaptive optics assembly, such telescope systems also generally include a tracking system. Whereas such conventional tracking systems are adequate in tracking objects imaged by the telescope system, such tracking systems have drawbacks. In this regard, the effectiveness of the closed-loop control of the tracking system in tracking the movement of the object is generally limited by the rate at which an imaging device can record an image received from the telescope system. For example, in a telescope system such as the 1.6 meter Gemini tracker, the tracking system includes an imaging device comprising a 128×128 speckle camera that has a maximum sample rate of 250 frames per second with an error rejection bandwidth of approximately 6 Hz. Because of the limit of the imaging device, some movement of the object, or residual jitter, of the object between each image taken by the focal plane array can escape the tracking system and cause degradation of images taken by the adaptive optics assembly.

SUMMARY OF THE INVENTION

In light of the foregoing background, embodiments of the present invention provide an improved optical tracking system, feed-forward augmentation assembly and method for controlling an optical imaging system, such as a telescope, capable of providing an image of a target. Advantageously, the optical tracking system, feed-forward augmentation assembly and method embodiments of the present invention are capable of modifying the reflector position drive signal with sensor data representative of a displacement position of the target. As such, the feed-forward augmentation assembly is capable of compensating for movement of the target that occur between instances in which images are received. By factoring in movement of the target, or residual jitter, between each image received, the optical tracking system, feed-forward augmentation assembly and method embodiments of the present invention can reduce the residual jitter that would otherwise cause degradation of images received by the optical imaging system.

According to one aspect of the present invention, a system is provided for controlling an optical imaging system capable of providing an image of a target. The system includes a closed-loop optical tracking system and a feed-forward augmentation assembly. The closed-loop optical tracking system comprises a reflector, an imaging device and a tracker controller. The reflector, which can be adjusted in at least one direction based upon images received from the optical imaging system, is capable of reflecting the image provided by the optical imaging system. In turn, the imaging device can record the image reflected by the reflector. And the tracker controller can generate a reflector position drive signal from a position of the target determined based upon the image recorded by the imaging device.

To reduce residual jitter in the reflector, the feed-forward augmentation assembly is capable of measuring a displacement of a position of the target. The feed-forward augmentation assembly can generate a feed-forward augmentation signal based upon the displacement measurement and the reflector position drive signal. More particularly, the feed-forward augmentation assembly can include a position sensor capable of measuring a current position of the target and a previous position of the target, such as based upon images received from the optical imaging system. In such embodiments, the feed-forward augmentation assembly can further include a beamsplitter capable of splitting the images received from the optical imaging system such that the position sensor receives a portion of the images and the reflector receives another portion of the images.

The feed-forward augmentation assembly can also include a signal processor that can then determine the displacement measurement based upon the current position of the target and the previous position of the target. In this regard, the signal processor can also be capable of generating the feed-forward augmentation signal based upon the displacement measurement and the reflector position drive signal. The signal processor can be capable of generating the feed-forward augmentation signal by determining jitter information based upon the reflector position drive signal and thereafter gain adjusting the displacement measurement based upon the jitter information. More particularly, the signal processor can be capable of comparing the jitter information based upon the reflector position drive signal with the jitter information based upon a previous reflector position drive signal. The signal processor can then be capable of gain adjusting the displacement measurement based upon the comparison.

With the feed-forward augmentation signal, then, the feed-forward augmentation assembly can combine the feed-forward augmentation signal and the reflector position drive signal to thereby drive the reflector to a position. In this regard, the feed-forward augmentation assembly can also include a summer capable of combining the feed-forward augmentation signal and the reflector position drive signal. Thus, the feed-forward augmentation signal can adjust repeatedly between images and, thus, between reflector position drive signals, to reduce residual jitter.

A feed-forward augmentation assembly and method of controlling the optical imaging system are also provided.

BRIEF DESCRIPTION OF THE DRAWINGS

Figure 1:
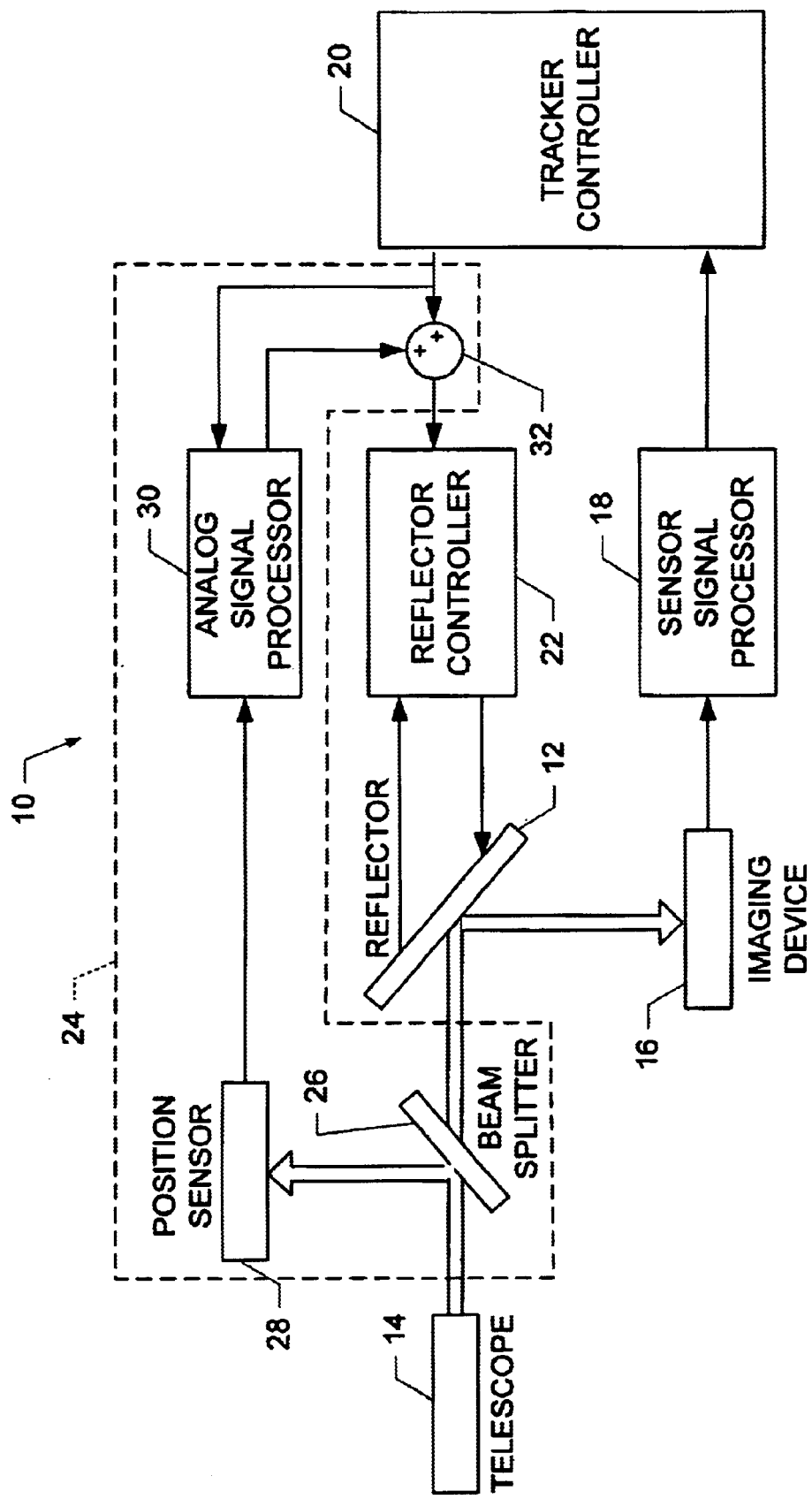
Figure 2:
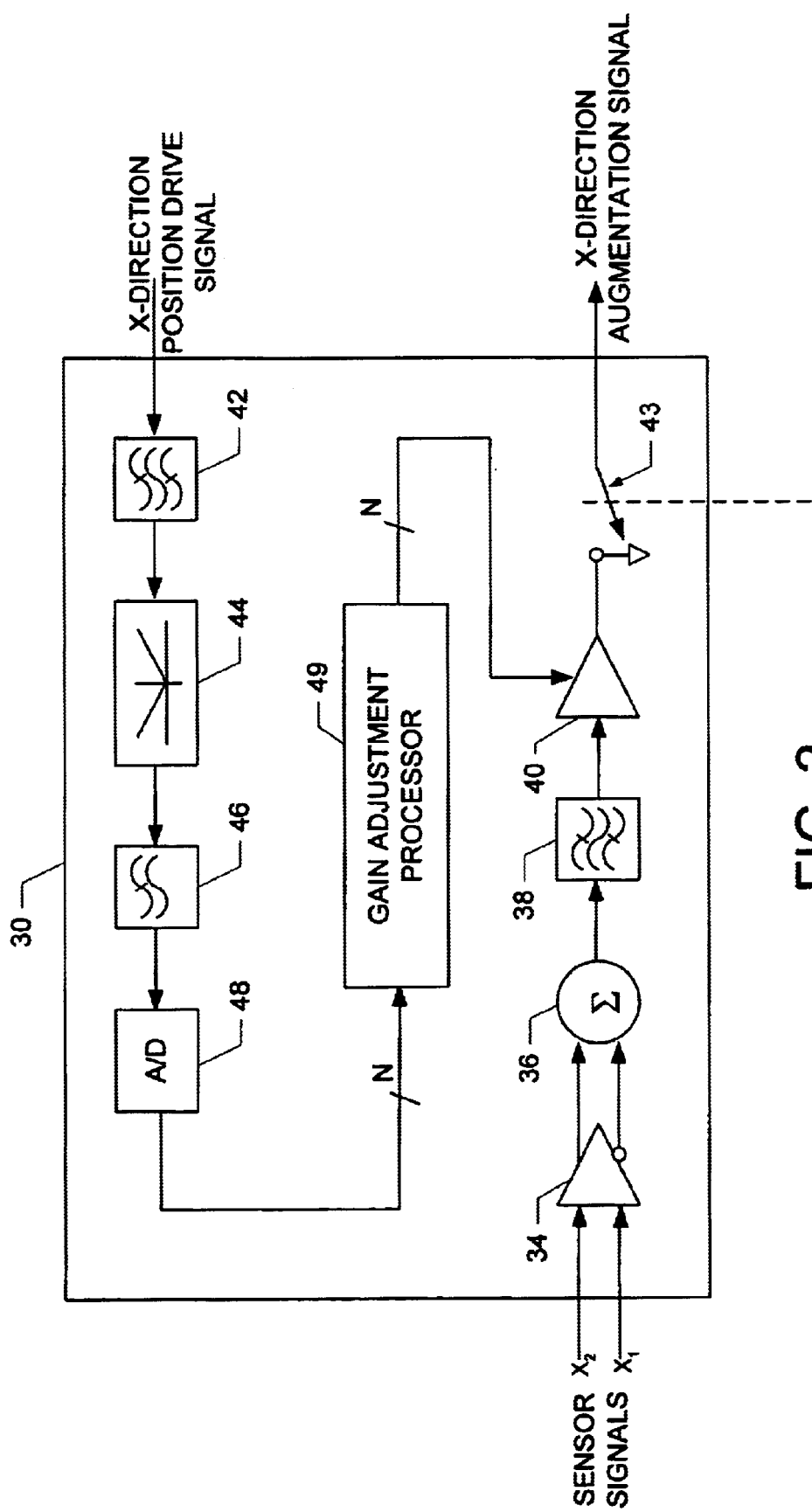
Figure 3:
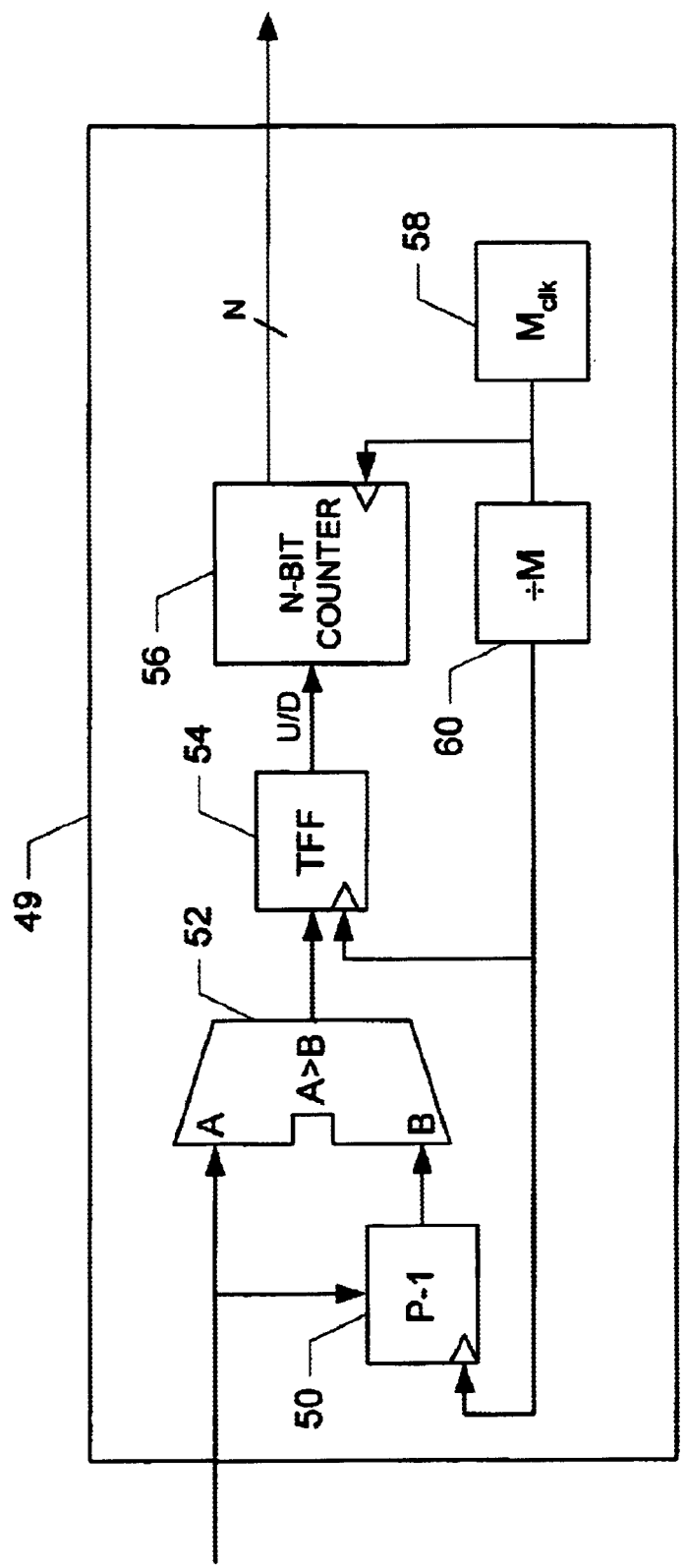

Having thus described the invention in general terms, reference will now be made to the accompanying drawings, which are not necessarily drawn to scale, and wherein:

FIG. 1 is a schematic block diagram of a tracking system for an optical imaging system, such as an adaptive optics telescope system, according to one embodiment of the present invention;

FIG. 2 is a schematic block diagram of an analog signal processor of a feed-forward augmentation assembly according to one embodiment of the present invention; and FIG. 3 is a schematic block diagram of a gain adjustment processor of the analog signal processor according to one embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Reference is now drawn to FIG. 1, which illustrates a block diagram of a tracking system 10 for an optical assembly, such as an adaptive optics assembly, as such are known. As shown, the tracking system includes a reflector 12, such as a fast steering mirror, that is capable of repeatedly reflecting images of a target, such as a star, received by a telescope 14, which typically includes the adaptive optics assembly comprising, among other elements, primary, secondary and tertiary mirrors. In this regard, the reflector reflects the images while applying phase tilt adjustments to the images. In turn, the images reflected by the reflector are recorded by an imaging device 16, such as a focal plane array or charge-coupled device (CCD) focal plane, following an analog-to-digital conversion process.

The images from the imaging device 16 can then be processed by a sensor signal processor 18, which repeatedly determines the center location of the image on a reference plane. The image center location is then fed into a tracker controller 20. And from the image center location, the tracker controller can repeatedly determine a position of the reflector 12 relative to both an X axis and Y axis, such as according to known integral control. The tracker controller, in turn, can pass reflector position drive signals for both the X axis and the Y axis to a reflector controller 22, which drives the reflector to the determined position. As will be appreciated, the reflector, telescope, imaging device, sensor signal processor, tracker controller and reflector controller can be made from conventional elements and collectively comprise any of a number of known optical tracking systems. For example, the reflector, telescope, imaging device, sensor signal processor, tracker controller and reflector controller can comprise elements of the Gemini telescope system, as such is well known to those skilled in the art.

As stated in the background, conventional tracking systems are limited in effectiveness by the rate at which the imaging device can update the image received from the fast steering mirror. For example, in a telescope system such as the 1.6 meter Gemini tracker, the tracking system includes an imaging device comprising a 128×128 speckle camera that has a maximum sample rate of 250 frames per second with an error rejection bandwidth of approximately 6 Hz. Because of the limit of the imaging device, some movement of the object, or residual jitter, of the object between each image taken by the focal plane array can escape the tracking system and cause degradation of images taken by the adaptive optics assembly. As such, certain embodiments of the present invention provide a feed-forward augmentation assembly 24 capable of modifying the reflector position drive signal with sensor data representative of a displacement position of the target. As such, the feed-forward augmentation assembly is capable of compensating for movement of the target, or residual jitter, between each image taken by the imaging device, which would otherwise cause degradation of images taken by the adaptive optics assembly.

As shown in FIG. 1, the feed-forward augmentation assembly 24 of one advantageous embodiment includes a beam splitter 26, a position sensor 28, an analog signal processor 30 and a summer 32. The beam splitter can comprise any of a number of different conventional devices capable of dividing the beam of light comprising the image received from the telescope 14 into two parts, one of which is eventually recorded by the imaging device 16 and the other of which is further analyzed to reduce residual jitter. In this regard, the beam splitter is capable of reflecting a portion of the beam of light to the position sensor. Thus, the position sensor is capable of receiving an image of the target, similar to that received by the reflector 12. The sensor 28 can comprise any of a number of known devices, but preferably comprises a high-speed position sensor that has a very high bandwidth, such as well in excess of 1.0 kHz. Upon receipt of the image of the target, the sensor is capable of providing a displacement measurement of the position of the target. In other words, the sensor is capable of providing a measurement of the position of the target relative to an immediately preceding position of the target from the prior image of the target.

As the beam splitter 26 is capable of providing an image of the target to the sensor 28, the sensor advantageously does not have a view of the reflector 12. Therefore, the sensor cannot interfere with the imaging device 16. In the Gemini tracker optical system, for example, an existing beam splitter disposed between the telescope 14 and the reflector creates an infrared sensor path that the conventional system does not use. Such a path, then, can be capable of providing infrared images to the sensor prior to the reflector, without modification to the optical configuration of the system. Also, such an optical path is not affected by the flexure of the bench during telescope slew, as such is known.

It will be appreciated that in embodiments where the beam splitter is capable of providing infrared images to the sensor, the sensor is configured to receive and proves such infrared images. In this regard, several operational characteristics of infrared sensor technology require conventional systems to provide significant adjustments to allow for maximum performance. These parameters can include gain correction due to image extent, gain adjustment for background light level, and offset elimination as a function of background light level, just to name a few. Advantageously, however, the sensor 28 is not used to control position and does not provide absolute position information. Using the sensor as a positional change sensitive device eliminates offsets and gain changes due to background energy. In fact, the system 10 is not appreciably affected by gain changes in the sensor due to any condition. Thus, the feed-forward augmentation assembly 24 need not provide significant adjustments of the operational characteristics of the sensor.

Reference is now drawn to FIG. 2, which more particularly illustrates a portion of the analog signal processor 30 of the feed-forward augmentation assembly 24. The elements of the analog signal processor, as well as the other elements of the feed-forward augmentation assembly, will be shown and described as processing signals and information in the X direction of a dual-axis reference plan upon which the target is imaged and the reflector 12 can be positioned. It will be appreciated, however, that although not separately shown, the same elements will also preferably exist within the feed-forward augmentation assembly for processing signals and information in the Y direction. Also, it will also be appreciated that the elements described below that are capable of processing the signals and information in the X direction can also be capable of processing the signals and information in the Y direction. For example, the elements can comprise dual-channel elements capable of separately processing signals and information in both the X and Y directions.

As shown in FIG. 2, the analog signal processor 30 is capable of accepting measurements from the sensor 28, which comprise first and second measurements of the target in the X direction, namely $X_1$ and $X_2$, at two different, preferably successive, instances in time. The analog signal processor includes an amplifier 34 that is capable of inverting the first measurement (i.e., $X_1$) such that when the measurements pass through a summer 36, a differential measurement can be obtained. In other terms, the summer is capable of determining a differential measurement of the target, i.e., $\Delta X$, by subtracting the second measurement from the first measurements, i.e., $\Delta X = X_2 - X_1$.

From the summer 36, the differential measurement is passed through a bandpass filter 38, which is designed to limit the frequency of the motion measurement, such as between 0.1 and 300 Hz. As such, the bandpass filter is capable of extracting the motion disturbance from the differential measurement. The motion disturbance is then passed to a digital gain control element 40. The digital gain control element can comprise any of a number of different devices but, in one embodiment, the digital gain control element comprises an N-bit multiplying digital-to-analog (D/A) converter configured as a compander (compressor/expander). The digital gain control element receives the motion disturbance and, utilizing jitter information derived from the reflector position drive signal, outputs a feed-forward augmented signal, as described below.

Before the digital gain control element 40 can utilize the jitter information, the analog signal processor 30 determines the jitter information from the reflector position drive signal generated in the tracker controller 20. In this regard, the analog signal processor is capable of receiving the reflector position drive signal, and thereafter passing the reflector position drive signal through a bandpass filter 42. The bandpass filter limits the reflector position drive signal to a frequency band, such as 0.1 to 21 Hz, to thereby collect the imaging device jitter information in the X direction. The jitter information is then passed through a full-wave rectifier 44 and a low pass filter 46 that collectively process the jitter information into the root-mean-square (RMS) of the jitter information.

The analog RMS jitter information in the X direction is then converted to digital RMS jitter information via an analog-to-digital (A/D) converter 48 that has a resolution of N-bits. The resolution of the A/D converter can vary based upon the desired output but, in one embodiment, the A/D converter has a resolution of 12 bits (i.e., N=12). As the digital RMS jitter information exits the A/D converter, the digital RMS jitter information is passed to a gain adjustment processor 49.

As shown in FIG. 3, upon entering the gain adjustment processor 49, the digital RMS jitter information is passed to a storage register 50 (designated P−1), which stores the current value of the digital RMS jitter information. And as the storage register stores the current value, the storage register outputs a previously stored value of the digital RMS jitter information. The previously stored value is then compared with the current value of the digital RMS jitter information, such as in a comparator 52.

Then, depending upon whether the current value of the digital RMS jitter information is greater than the previous value of the digital RMS jitter information, a T-flip flop 54 is toggled to drive an N-bit counter 56 to count up or down. In this regard, if the current value is larger than the previous value, the T-flip flop toggles the direction the N-bit counter is counting. Thus, if the counter is currently set to count up and the current value if the digital RMS jitter information is larger than the previous value, the respective T-flip flop will drive the counter to count down. In contrast, if the counter is currently set to count up and the current value of the digital RMS jitter information is smaller than the previous value, the T-flip flop will drive the counter to remain counting up.

Once the T-flip flop 54 has driven the direction of the counter 56, the counter performs a predefined number of counts, M, per sample period of the digital RMS jitter, with the predefined number of counts per sample period controlled by a clock 58 (designated $M_{clk}$). In this regard, the value of M is based upon the desired response rate of the tracking system 10. For example, presume the desired response rate of the system is on the order of 1 Hz, and the sample period of the digital RMS jitter information is set to 20 ms (i.e., sample frequency of 50 Hz). If the counter comprises a 12-bit counter including a total count of 4096 (i.e., $2^{12}$), the value of M could be set on the order of 82 counts per sample period (i.e., approximately 4096 counts×

20 ms/sample period). From the foregoing, it should be noted that the desired sample period of the digital RMS jitter information is typically set lower than the period at which the imaging device 16 records images of the target and, thus, the period at which the original reflector position drive signal generated in the tracker controller 20. Thus, the feed-forward augmentation assembly 24 can generate multiple feed-forward augmented signals (described below) for each original reflector position drive signal generated.

In addition to the clock signal driving the counter 56, the clock signal is passed through a divider 60 (designated ÷M) to divide the clock signal down to the sample rate of the digital RMS jitter information. The sample rate of the digital RMS jitter information, then, controls operation of the storage register 50 and the T-flip flop 54. The clock signal controlling the counter, then, can be considered the gain of the counter. In other terms, the number of counts of the counter up or down per digital RMS jitter sample in the predefined period of time is directly proportional to the magnitude of the gain change effected upon the motion disturbance information in the digital gain control element 40.

After the N-bit counter 56 has counted up or down for the predefined number of counts, M, the N-bit count value is fed into the digital gain control element 40, as shown in FIG. 2. The digital gain control element receives the N-bit count value, otherwise referred to as the gain adjustment value, and along with the motion disturbance, generates the feed-forward augmented signal. The feed-forward augmented signal then passes to the summer 32 of the feed-forward augmentation assembly 24, as shown in FIG. 1. The summer adds the feed-forward augmented signal to the original reflector position drive signal generated in the tracker controller 20, and thereafter passes the combined signal to the reflector controller 22. In turn, the reflector controller drives the reflector 12 into a position based upon the combined signal. Advantageously, the system 10 experiences less residual jitter by virtue of the feed-forward augmented signal that the summer added to the original reflector position drive signal.

It will be appreciated that in some instances it would be desirable to drive the reflector 12 into position based upon only the original reflector position drive signal generated in the tracker controller 20. For example, it could be desirable to drive the reflector into position based upon only the original reflector position drive signal during alignment, calibration, evaluation and repair of the tracking system 10. In such instances, the output of the analog signal processor 30 can be disabled, such as via a switch 43 disposed at the output of the digital gain control element 40. Thus, when the output of the analog signal processor is disabled, the summer 32 will only pass the reflector position drive signal to the reflector controller.

As previously stated, the elements of the analog signal processor 30, as well as the other elements of the feed-forward augmentation assembly 24, are shown and described as processing signals and information in the X direction. In this regard, the same elements will also preferably exist within the feed-forward augmentation assembly for processing signals and information in the Y direction. Also, the elements described above capable of processing the signals and information in the X direction can also be capable of processing the signals and information in the Y direction. For example, the digital gain control element can comprise a dual-channel N-bit multiplying digital-to-analog (D/A) converter, such as a LTC1590 model dual serial 12-bit multiplying DAC manufactured by Linear Technology Corporation of Milpitas, Calif. In this regard, the N-bit count value for each direction can be concatenated into a 2N-bit count signal that is serially fed into the digital gain control element and thereafter separated into the two channels within the digital gain control element.

Therefore, the optical tracking system, feed-forward augmentation assembly and method of embodiments of the present invention are capable of controlling an optical imaging system, such as a telescope, that is capable of providing an image of a target. Advantageously, the optical tracking system, feed-forward augmentation assembly and method of embodiments of the present invention can modify the reflector position drive signal with sensor data representative of a displacement position of the target. As such, the feed-forward augmentation assembly is capable of factoring movement of the target. And by factoring in movement of the target, or residual jitter, between each image received, the optical tracking system, feed-forward augmentation assembly and method of embodiments of the present invention can reduce the residual jitter that would otherwise cause degradation of images received from the telescope.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for controlling an optical imaging system capable of providing an image of a target, said system comprising:

a closed-loop optical tracking system comprising:

a reflector capable of reflecting the image provided by the optical imaging system, wherein said reflector is capable of being adjusted in at least one direction based upon movement of the image received from the optical imaging system;

an imaging device capable of recording the image reflected by said reflector; and a tracker controller capable of generating a reflector position drive signal from a position of the target determined based upon the image recorded by said imaging device; and an feed-forward augmentation assembly capable of measuring a displacement of a position of the target, wherein said feed-forward augmentation assembly is also capable of generating a feed-forward augmentation signal based upon the displacement measurement and the reflector position drive signal, and wherein said feed-forward augmentation assembly is capable of combining the feed-forward augmentation signal and the reflector position drive signal to thereby drive the reflector to a position.

2. A system according to claim 1, wherein said feed-forward augmentation assembly comprises:

a position sensor capable of measuring a current position of the target and a previous position of the target;

a signal processor capable of determining the displacement measurement based upon the current position of the target and the previous position of the target, wherein said signal processor is also capable of generating the feed-forward augmentation signal based upon the displacement measurement and the reflector position drive signal; and a summer capable of combining the feed-forward augmentation signal and the reflector position drive signal.

3. A system according to claim 2, wherein said signal processor is capable of determining jitter information based upon the reflector position drive signal and thereafter gain adjusting the displacement measurement based upon the jitter information.

4. A system according to claim 3, wherein said signal processor is capable of comparing the jitter information based upon the reflector position drive signal with the jitter information based upon a previous reflector position drive signal, and wherein said signal processor is capable of gain adjusting the displacement measurement based upon the comparison.

5. A system according to claim 2, wherein said position sensor is capable of measuring the current position of the target and the previous position of the target based upon images received from the optical imaging system.

6. A system according to claim 5, wherein said feed-forward augmentation assembly further comprises a beamsplitter capable of splitting the images received from the optical imaging system such that said position sensor receives a portion of the images and said reflector receives another portion of the images.

7. A feed-forward augmentation assembly capable of augmenting a reflector position drive signal generated by a closed-loop optical tracking system to thereby drive a reflector of the closed-loop optical tracking system, wherein the closed-loop optical tracking system is capable of controlling an optical imaging system capable of providing an image of a target, said feed-forward augmentation assembly comprising:

a position sensor capable of measuring a current position of the target and a previous position of the target;

a signal processor capable of determining the displacement measurement based upon the current position of the target and the previous position of the target, wherein said signal processor is also capable of generating a feed-forward augmentation signal based upon the displacement measurement and the reflector position drive signal; and a summer capable of combining the feed-forward augmentation signal and the reflector position drive signal to thereby drive the reflector of the closed-loop optical tracking system to a position.

8. A feed-forward augmentation assembly according to claim 7, wherein said signal processor is capable of determining jitter information based upon the reflector position drive signal and thereafter gain adjusting the displacement measurement based upon the jitter information.

9. A feed-forward augmentation assembly according to claim 8, wherein said signal processor is capable of comparing the jitter information based upon the reflector position drive signal with the jitter information based upon a previous reflector position drive signal, and wherein said signal processor is capable of gain adjusting the displacement measurement based upon the comparison.

10. A feed-forward augmentation assembly according to claim 7, wherein said position sensor is capable of measuring the current position of the target and the previous position of the target based upon images received from the optical imaging system.

11. A feed-forward augmentation assembly according to claim 10 further comprising a beamsplitter capable of splitting the images received from the optical imaging system such that said position sensor receives a portion of the images and the reflector receives a portion of the images.

12. A method of controlling an optical imaging system capable of providing an image of a target, said method comprising:

reflecting the image provided by the optical imaging system via a reflector;

generating a reflector position drive signal from a position of the target determined based upon the image reflected;

generating a feed-forward augmentation signal based upon a displacement measurement of a position of the target;

combining the feed-forward augmentation signal and the reflector position drive signal into a combined signal; and driving the reflector to a position in at least one direction based upon the combined signal.

13. A method according to claim 12 further comprising recording the image reflected by the reflector, wherein generating a reflector position drive signal comprises generating the reflector position drive signal from a position of the target determined based upon the image recorded.

14. A method according to claim 12 further comprising measuring the displacement of the position of the target before generating the feed-forward augmentation signal.

15. A method according to claim 14, wherein measuring the displacement comprises measuring a current position of the target and a previous position of the target and thereafter determining the displacement measurement based upon the current position of the target and the previous position of the target.

16. A method according to claim 12, wherein generating the feed-forward augmentation signal is further based upon the reflector position drive signal.

17. A method according to claim 16, wherein generating the feed-forward augmentation signal comprises determining jitter information based upon the reflector position drive signal and thereafter gain adjusting the displacement measurement based upon the jitter information.

18. A method according to claim 17, wherein generating the feed-forward augmentation signal further comprises comparing the jitter information based upon the reflector position drive signal with the jitter information based upon a previous reflector position drive signal, and wherein gain adjusting the displacement measurement comprises gain adjusting the displacement measurement based upon the comparison.

* * * * *